United States Patent
Huddle et al.

(10) Patent No.: US 6,652,010 B1
(45) Date of Patent: Nov. 25, 2003

(54) REAR IMPACT GUARD ASSEMBLY FOR TRAILERS

(75) Inventors: Thomas Huddle, Charleston, IL (US); Timothy C. Gossett, Metcalf, IL (US); Raymond D. Fox, Shelbyville, IL (US)

(73) Assignee: Great Dane Limited Partnership, Chicago, IL (US)

( * ) Notice: Subject to any disclaimer, the term of this patent is extended or adjusted under 35 U.S.C. 154(b) by 0 days.

(21) Appl. No.: 09/658,403

(22) Filed: Sep. 8, 2000

Related U.S. Application Data

(60) Provisional application No. 60/153,381, filed on Sep. 10, 1999.

(51) Int. Cl.[7] .............................................. B60R 19/02
(52) U.S. Cl. ........................ 293/102; 293/103; 293/132; 293/133; 293/142; 293/148
(58) Field of Search ................................. 293/102, 103, 293/118, 119, 132, 133, 142, 146, 147, 148

(56) References Cited

U.S. PATENT DOCUMENTS

| | | | | | |
|---|---|---|---|---|---|
| 3,871,695 A | * | 3/1975 | Koenig | ........................ | 293/118 |
| 3,913,963 A | * | 10/1975 | Persicke | ................. | 293/118 X |
| 4,026,590 A | * | 5/1977 | Holm | ........................ | 293/118 |
| 4,105,237 A | * | 8/1978 | Viall, Sr. et al. | ........ | 293/102 X |
| 4,247,138 A | * | 1/1981 | Child | ........................ | 293/103 |
| 4,359,239 A | * | 11/1982 | Eggert, Jr. | ................. | 293/132 |
| 4,410,207 A | * | 10/1983 | Scharf | ........................ | 293/118 |
| 4,988,258 A | * | 1/1991 | Lutz et al. | .................. | 293/118 |
| 4,991,681 A | * | 2/1991 | Paulson | ........................ | 293/5 |
| 5,360,311 A | * | 11/1994 | Lutz et al. | .................. | 293/118 |
| 5,507,546 A | * | 4/1996 | Holley | ........................ | 293/133 |
| 5,520,428 A | * | 5/1996 | Bell | ............................ | 293/118 |
| 5,624,143 A | * | 4/1997 | Waldschmitt | ............... | 293/118 |
| 5,632,518 A | * | 5/1997 | Kendall | ...................... | 293/103 |
| 5,673,953 A | * | 10/1997 | Spease | ........................ | 293/118 |
| 5,697,657 A | * | 12/1997 | Unrath, Sr. | ................. | 293/118 |
| 6,089,629 A | * | 7/2000 | Hope et al. | ................. | 293/132 |
| 6,116,667 A | * | 9/2000 | Torcomian | ................. | 293/132 |
| 6,176,529 B1 | * | 1/2001 | Kitzmiller et al. | .......... | 293/102 |

* cited by examiner

*Primary Examiner*—Stephen T. Gordon
*Assistant Examiner*—Lori L Coletta

(57) ABSTRACT

A rear impact guard assembly for trailers for absorbing the energy of a rear impact from another vehicle including a pair of tubular vertical guards having a lower tubular horizontal tube mounted at their lower ends. The upper ends of the vertical guards are attached to a horizontal beam, which in turn is affixed to longitudinally extending side rails. The vertical guards are removably affixed to the horizontal beam and respectively removable affixed to the slide rails. Tubular members extend through holes

17 Claims, 6 Drawing Sheets

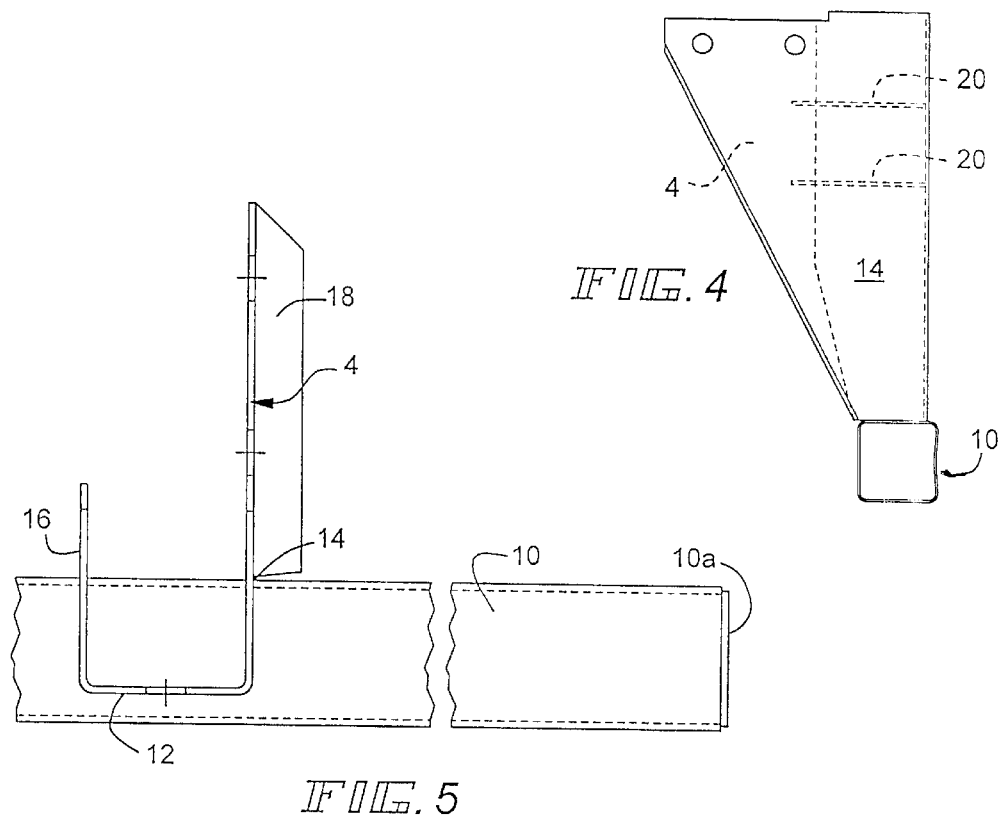
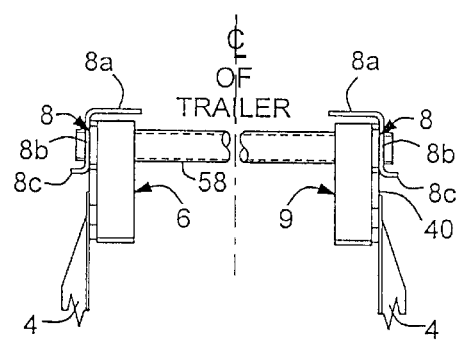
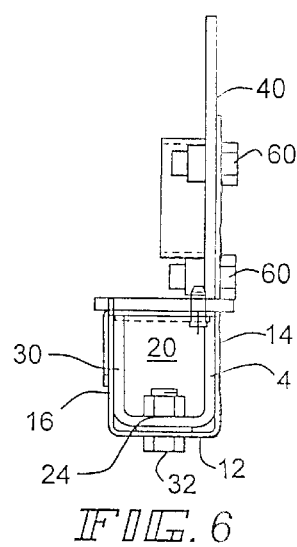

REAR IMPACT GUARD ASSEMBLY FOR TRAILERS

This application claims benefit of the filing date of Provisional application, Ser. No. 60/153,381 filed Sep. 10, 1999.

BACKGROUND OF THE INVENTION

1. Field of the Invention

This invention relates in general to cargo carrying trailers and, more particularly, to a rear impact guard assembly for a trailer.

2. Summary of the Prior Art

Cargo carrying trailers for highway use are commonly elevated from the highway. As a result, it is known that automobiles and other vehicles commonly impact underneath the back structure of a trailer during rear collisions causing possible serious injury and damage to the colliding vehicles. In order to reduce the damage caused by rear collisions of trailers, recent federal regulations have been introduced requiring the presence of impact guards having defined strength characteristics to reduce both injury and damage. For example, impact guards for trailers must withstand certain minimum impact forces and to absorb energy from impact within 5 inches of plastic deformation of the impact guard as a result of collisions up to thirty miles per hour. Many known techniques for reducing damage due to rear collisions of trailers employ relatively heavy components, which do not provide optimum protection and economy of assembly and repair. With prior rear protection, damage to the structural components of the trailer as a result of rear collisions can also occur. These damaged structural components require costly and time-consuming repair in order to restore the trailer to a safe operating condition.

In the past, damaged trailers sometimes are operated with severely deformed rear components, such as bumpers, guards and the like. By being operated in such a damaged state, rear impact protection may be compromised because of which federal regulations are being considered to require the replacement of all severely deformed rear impact guards. To replace damaged rear guards, previous impact guard systems require expensive replacement and repair in order to restore the components to an optimally safe, undamaged condition.

Previous designs of impact guards further do not provide an optimally economical replacement after a trailer is subjected to a rear collision. Accordingly, it is desirable in the prior art to provide an improved impact guard assembly to be used at the rear of a trailer body to absorb the energy of rear impact without significant damage to the trailer structure.

SUMMARY OF THE INVENTION

It is, therefore, an objective of the invention to provide an improved impact guard assembly to minimize injury and damage occurring as a result of impact against the rear of a trailer body by an automobile and the like. The impact guard assembly herein disclosed includes a plurality of vertical guards and a horizontal bumper which assembly is suitably affixed for removal to the rear of the trailer. The impact guard of the invention exceeds applicable standards regarding the absorption of impact forces as prescribed by federal law. After impact the assembly herein disclosed undergoes permanent plastic deformation and may be readily replaced by an undamaged impact assembly by removal of bolts or attachment techniques. The effectiveness of the absorption of energy insures that the components of the trailer frame on which the impact guard is removably mounted are not subjected to potential damaging deformation under a large range of impact conditions. Accordingly, the invention effectively isolates the major structural components from the damaging effects of rear collisions. By protecting the major trailer components, the costs and time required for repair are greatly reduced by the invention.

The design of the rear guard assembly herein provides a lightweight structure, which is economical to manufacture because of open sections and less parts. The rear guard assembly further provides a controlled and predictable deformation as a result of impact. Ease of assembly and disassembly for repair is facilitated by convenient bolted or riveted attachment of guard assembly to the trailer frame. The rear guard assembly herein not only is affixed to the rear sill, but also to the trailer slider rails for transfer of the loads imposed by impact to provide under a structure with improved strength. The invention provides an effective technique of preventing injury and minimizing damage to a colliding vehicle and to the trailer structure apart from the rear impact assembly as compared to prior art, rear protection techniques. In addition, the rear impact assembly herein disclosed may be readily removed even in a deformed state and replaced by a new assembly for economy and convenience allowing an impacted trailer to quickly return to service.

BRIEF DESCRIPTION OF THE DRAWINGS

FIG. 4 is a side elevational view of the rear impact guard assembly of FIG. 1 without the mounting assembly;

FIG. 5 is a top plan view of FIG. 2 taken along lines of 5—5;

FIG. 6 is top plan view of FIG. 1 without the slide rail;

FIG. 7 is a partial end view taken along lines 7—7 of FIG. 1;

DESCRIPTION OF THE PREFERRED EMBODIMENT

Figure 1:
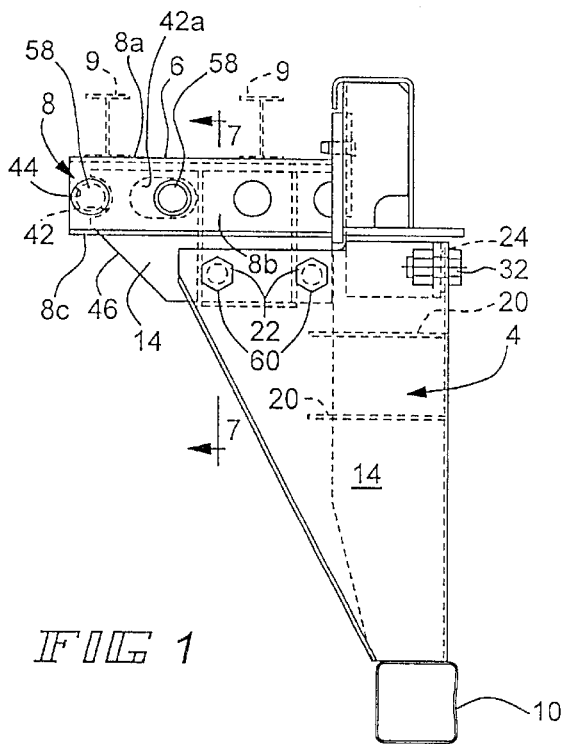
FIG. 1 is a side elevational view of the rear impact guard assembly for trailers of the invention.
Figure 3:
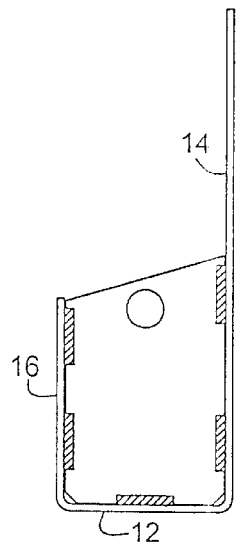
FIG. 3 is a top plan view taken along line 3—3 of FIG. 2.
Figure 8:
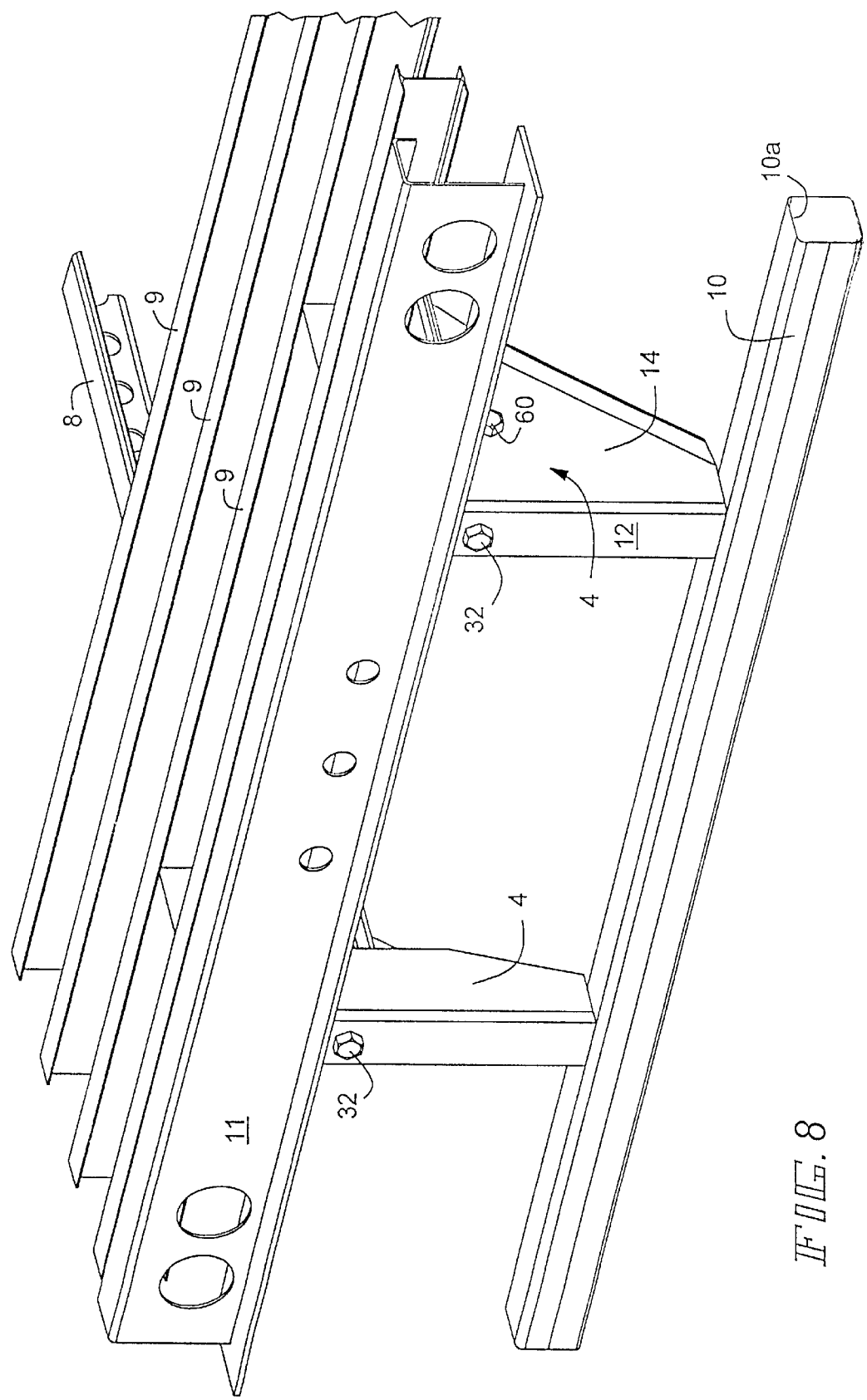
FIG. 8 is a partial front perspective view of the rear impact guard assembly of the invention shown mounted on the rear frame of a trailer.
Figure 9:
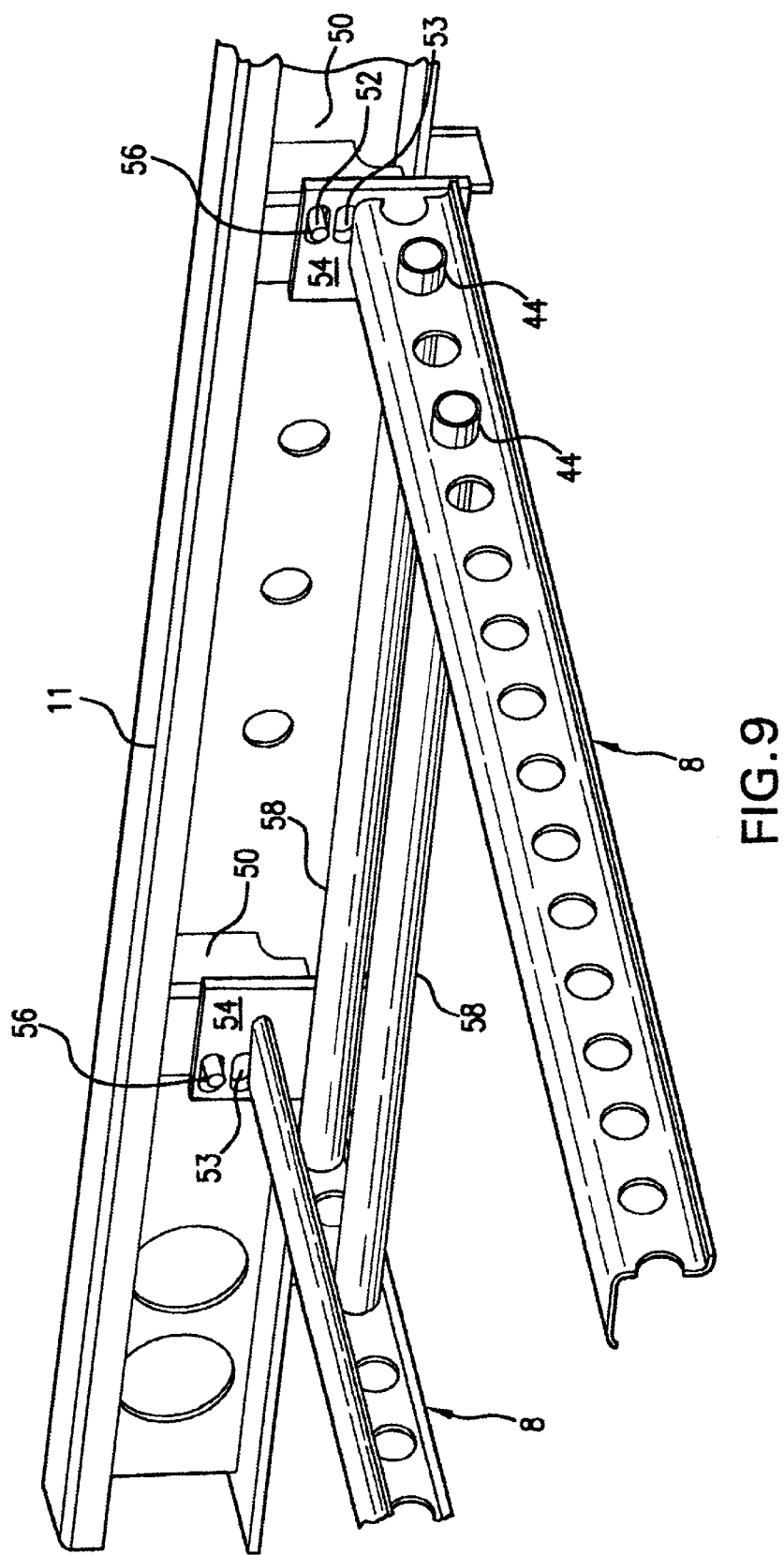
FIG. 9 is a back partial perspective view of the rear impact guard assembly of FIG. 8.
Figure 10:
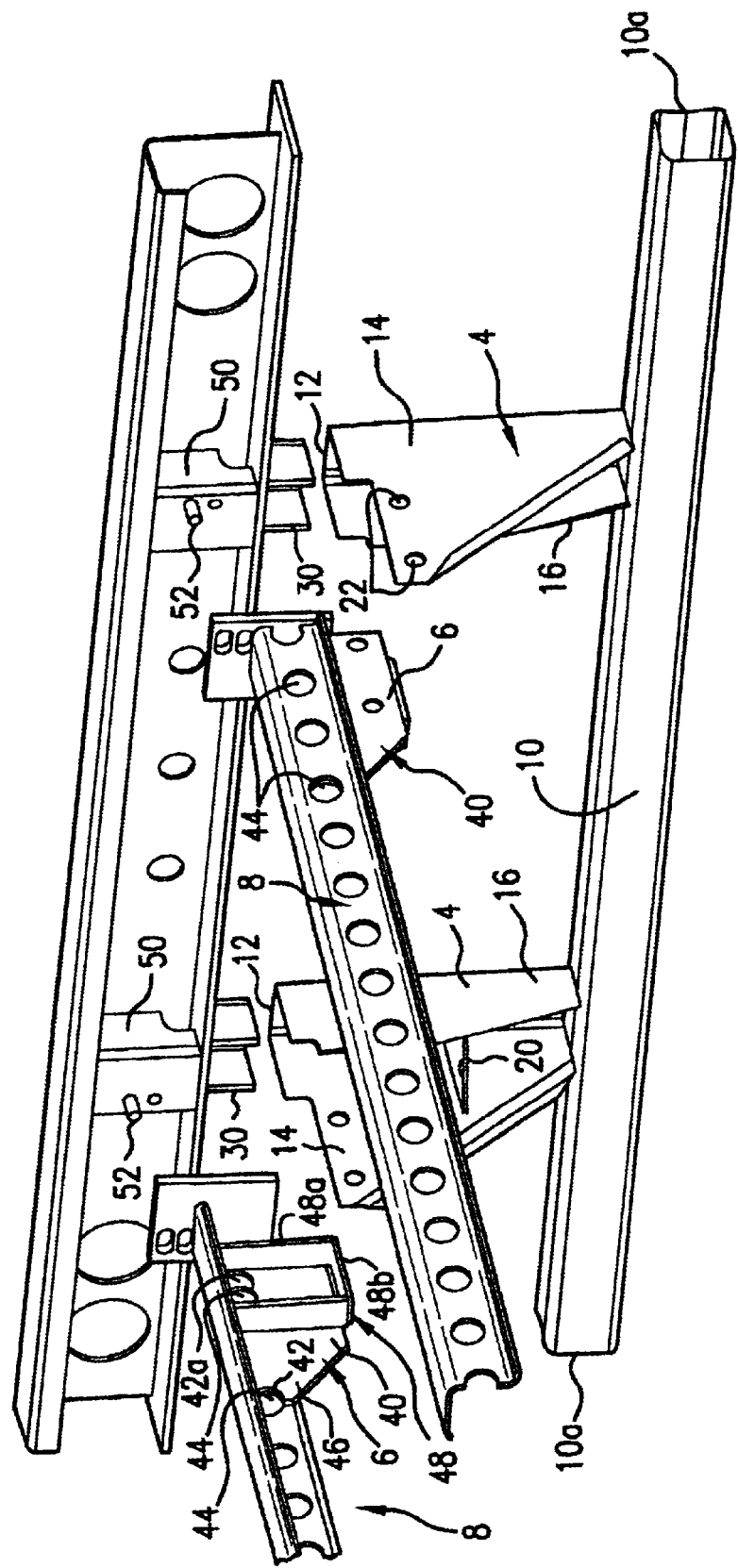
FIG. 10 is a back partial perspective view with parts shown disassembled of the rear impact guard assembly of the invention.
Figure 11:
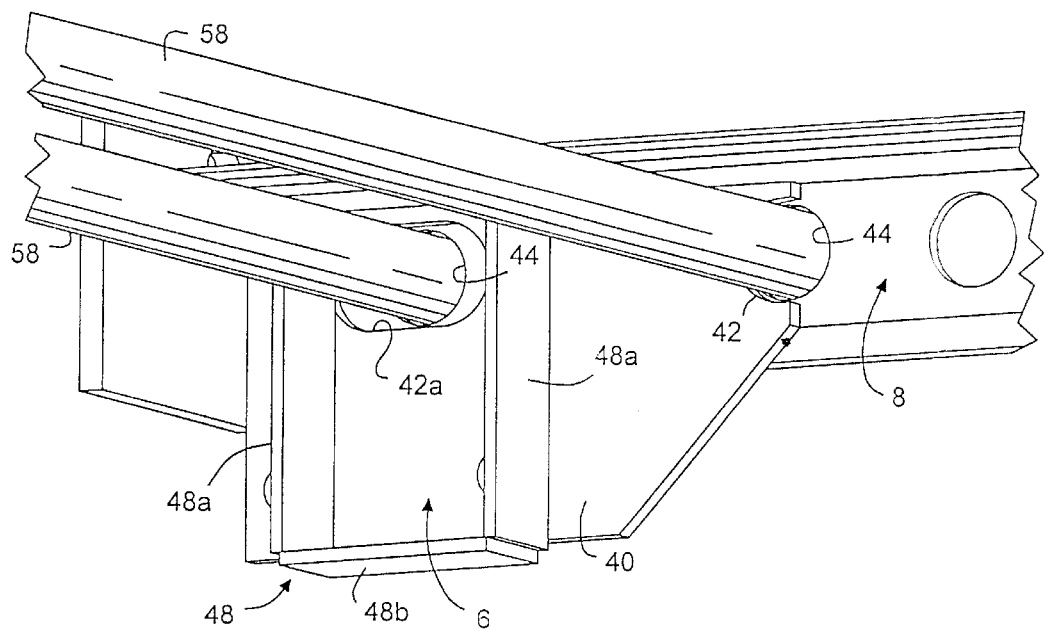
FIG. 11 is a side perspective view of the mounting of the cross tubes of the side of the rear impact guard assembly of FIG. 8.

Referring now to FIGS. 1–12, there is illustrated the rear impact guard assembly of the invention for trailers being generally designated by reference numeral 2 and formed from a suitable metal and the like. The rear impact guard assembly 2 is provided with a pair of vertical guards 4 and a side mounting bracket assembly 6 as seen in FIGS. 1, 6 and 10. A respective side mounting bracket assembly 6 supports each of the vertical guards 4 in attached relationship thereto and to a longitudinally extending slide rail 8 in a manner to be described. The slide rail 8 is conventionally used in trailers and possesses a cross-sectional shape having a top horizontal section 8a, and intermediate vertical section 8b and lower short horizontal cross section 8c (FIG. 7). The upper horizontal section 8a of the slide rail is affixed to the conventional structural cross I-beams 9 on the underside frame and the rear door frame of the trailer body as shown in FIGS. 1 and 8. The lower end of the vertical guard 4 is affixed by welding or bolts (not shown) to the rear cross guard member 10 of the rear impact guard assembly 2. The cross guard member 10 in the form a tubular structure and has free ends 10a and is supported by the vertical guards 4. Alternatively, the horizontal cross guard 10 may be otherwise affixed to a vertical post or other member (not shown) of the trailer body. As best shown in FIGS. 8 and 10 the pair of vertical guards 4 are secured at the upper end to the rear sill 11 of the trailer as will be described. The rear sill 11 is connected to the conventional major structural underframe of the trailer.

Figure 2:
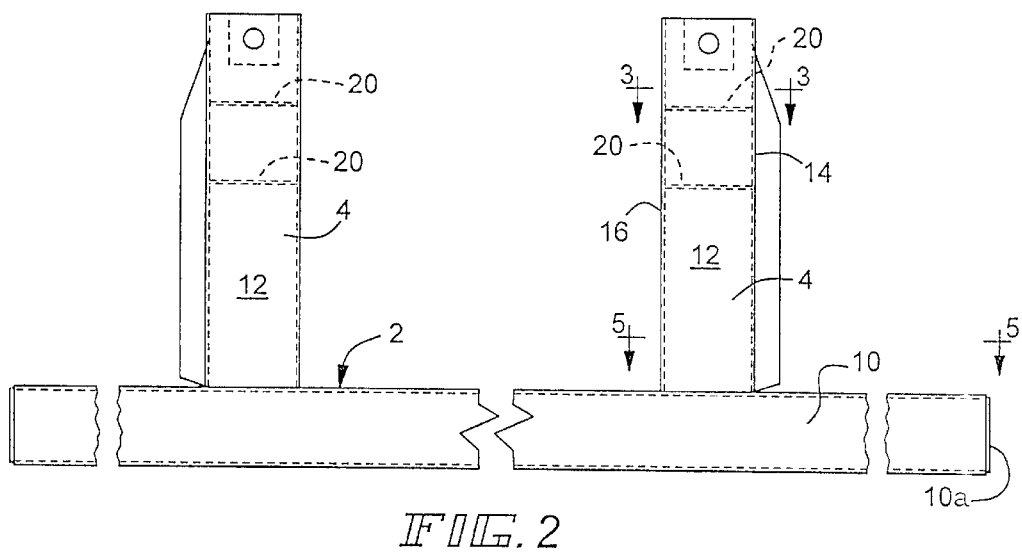
FIG. 2 is a partial end view of the rear impact guard assembly of FIG. 1 with parts broken away.

Details of the vertical guard 2 are best shown in FIGS. 1–5. Although two vertical guards 4 are shown utilized in connection with the invention (FIG. 2), it is within the scope of the invention to use other number of vertical guards as is appropriate under given circumstances. Each of the vertical guards 4 are fabricated with a modified U-shaped cross section having an intermediate wall 12 facing rearward from the trailer, an elongated side flange 14 and a shorter opposed side flange 16 whereby the vertical guard 4 is open at its rear facing the front of the trailer and at its top and bottom. As best seen in FIGS. 2, 4, and 5, the elongated flange 14 of the vertical guard 4 includes a reinforcement flange 18 which serves as an additional stiffener to flange 14. Each vertical guard 4 is provided with a pair of horizontal gussets 20 which are respectively welded to side flanges 14 and 16, and front wall 12 of the vertical guard 4. Although two gussets 20 are shown, it is within the scope of the invention to use one or more than two gussets if desired. Under impact forces, the vertical guards 4 are subjected normally to torsional loading to cause the vertical guards 4 to undergo plastic deformation in a controlled manner. Control of the deformation of the vertical guard 4 is achieved by the transfer of loading and bending by gussets 20 between the flanges 14 and 16 and because of the presence of reinforcement flange 18. The combined effect of gussets 20 and reinforcement flange 18 serves to insure that deformation of the vertical guards 4 due to excessive impact forces commences at the gussets 20 to result in predictable deformation of the vertical guards for superior control of impact forces. It is an important function of the vertical guards 4 along with horizontal member 10 to not only absorb the forces of impact in a range exceeding federal regulations, but to insure that damaging deformation forces are not transferred to slide rails and the underframe of the trailer through rear sill 11. The flange 14 includes a pair of upper bracket securement holes 22 (FIGS. 1 and 10). The vertical guard 4 further has an upper mounting attachment hole 24 (FIG. 1) disposed through front wall 12 for attachment to the trailer intermediate cross member 11 at its upper position (FIGS. 1 and 6).

Figure 12:
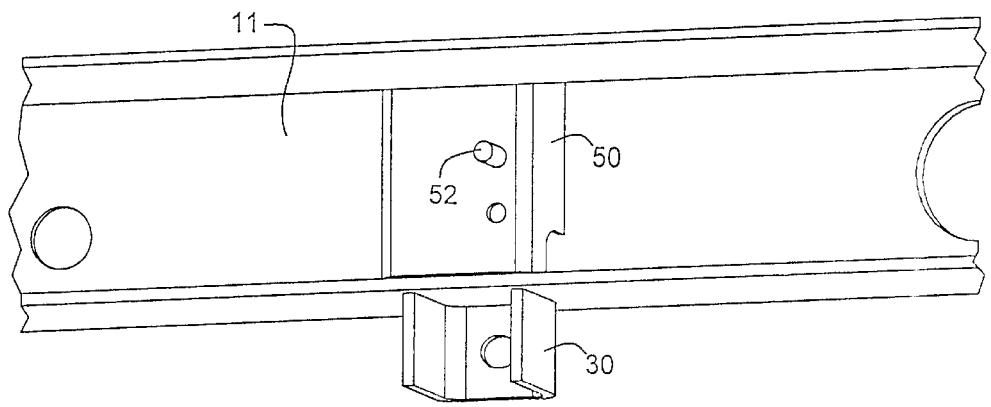
FIG. 12 is an enlarged partial perspective back view of the bumper mounting for the rear impact guard assembly of the invention.

As is best seen in FIGS. 8, 9, 10, and 12, the mounting of the upper portion of the vertical guard 4 is accomplished through use of a U-shaped channel weldment 30 which is welded to the underside of the rear sill 11 of the trailer. The weldment 30 has a cross sectional configuration in shape allowing it to telescope snugly within the top of the vertical guard 4 whereby a bolt assembly 32 (FIGS. 1,6, and 8) affixes the vertical guard 4 to the weldment 30 and hence to the intermediate cross member 11. The side mounting bracket 6 includes a vertical plate 40 as seen in FIGS. 1, 6, 7, 10, and 11. The inside end of the side mounting bracket 6 includes a curvilinear upper portion 42 having a shape corresponding to a segment of one of the conventional holes 44 provided in the slide rail 8. The lower portion 46 of the side mounting bracket 6 is angularly cutoff whereas the remainder of the edges bottom, top and front edges of the side mounting bracket 6 are straight. A U-shaped section 48 having a pair of vertical plates 48a and a lower horizontal plate 48b is welded to the flat plate 40 as reinforcement members. The side mounting bracket 6 further is provided with an elongated hole 42a for each slide rail 8. A channel/cross-member reinforcement 50 having a modified U-shape is suitably attached by welding and the like to the side of the rear sill 11 as best seen in FIGS. 9, 10 and 12 and includes a projecting attachment pin 52. The pin 52 not only facilitates assembly/disassembly of the rear bumper guard assembly 2, but transfers impact loads to the rear sill 11 and out to the trailer bottom outer rails (not shown) without deformation of the slider rails 8. Channel 50 further reinforces the rear sill and transmits excessive torsional loads to the rear sill 11 through pin 52 and to the bottom outer rails (not shown). The channel 50 reinforces the flanges of the cross-member against deformation for forces not absorbed by rear guard assembly 2 and are transmitted to the rear sill and the outer bottom rails. The pair of slide rails 8 are provided with a vertical end plate 54 having suitable holes 56 such that the pins 52 are inserted in the slide end rail plate 54 for support. A bolt assembly (not shown) also attaches the plate 54 to the channel 50 through hole 53 (FIG. 9). A pair of cross-tubular member 58 extend between the pair of slide rails 8 and have end portions projecting through aligned pairs of holes 44. The end portion of one of the tubular members 58 also extends through elongated hole 42a of bracket 6 while the interior tubular member 58 extends through slide rail hole 44 disposed adjacent to the upper curvilinear section 42 of plate 40 of the side bracket assembly 6. Conventionally, the holes in the slide rails may be spaced by different center spacings. Thus, elongated hole 42 permits universal mounting of the assembly under different center spacings. The structure of the tubular members 58 and the side mounting bracket assembly aid in strengthening the trailer sub-frame and slide rails preventing torsional impact forces to damage said rails.

Under impact conditions, the vertical guards 4 and cross guard 10 demonstrate physical strength characteristics to absorb energy of impact within 5 inches of permanent deformation under conditions prescribed by law. After deformations of guard components occur, each of the vertical guards 4 and horizontal guard 10 so damaged may be readily removed as a unit through removal of bolts 32 and 60. The side bracket assembly 6 can also be replaced if necessary. In certain situations, it is also possible to remove vertical guard 4 separately from horizontal guard 10 under situations in which separation between the lower end of vertical guards 4 and lower horizontal guard 10 can be separated such as, for example, the vertical guard 4 and guard 10 being interconnected by bolt assemblies or other means permitting separation of the parts. Upon removal of the damaged components, a replacement guard assembly can easily be accomplished by reinsertion of the bolt assemblies. The deformation of the impact guard assembly 2 not only minimizes damage to the colliding vehicle, but also alleviates structural damage to the trailer.

What is claimed is:

1. A rear impact guard assembly for a vehicle from protection against forces applied by rear impacts comprising a plurality of vertical guards being affixed to a rear of the vehicle and having upper and lower end portions, a horizontal member being affixed to the lower end portion of said plurality of vertical guards, said upper portion of said vertical guard being attached to a structural beam of a vehicle frame, said vertical guards undergoing plastic deformation in response to rear impacts for absorption of the forced applied without damage to the vehicle, said plurality of vertical guards include a U-shaped configuration, said U-shaped configuration includes a rearwardly facing wall and a pair of flanges, one of said flanges being wider than another of said flanges.

2. A rear impact guard assembly for a vehicle from protection against forces applied by rear impacts comprising a plurality of vertical guards being affixed to a rear of the vehicle and having upper and lower end portions, a horizontal member being affixed to the lower end portion of said plurality of vertical guards, said upper portion of said vertical guard being attached to a structural beam of a vehicle frame, and said vertical guards undergoing plastic deformation in response to rear impacts for absorption of the forced applied without damage to the vehicle, and each of said plurality of vertical guards are removably attached to a rear sill of a trailer, and reinforcement means attached to the upper portion of the vertical guard for strengthening the rear sill of the trailer.

3. The rear guard assembly according to claim 2 wherein said reinforcement means includes a U-shaped cross-section.

4. The rear guard assembly according to claim 3 wherein said reinforcement means is arranged to be attached to the longitudinal rails of the trailer.

5. The rear impact guard assembly according to claim 4 further including a mounting bracket assembly affixed to the slide rails of the trailer, each of said vertical guards being removably connected to said mounting bracket assembly.

6. The rear impact guard assembly according to claim 5 wherein said bracket has a plurality of holes, at least one tube member extending between said plurality of holes.

7. A rear impact guard assembly for a vehicle from protection against forces applied by rear impacts comprising a plurality of vertical guards being affixed to a rear of the vehicle and having upper and lower end portions, a horizontal member being affixed to the lower end portion of said plurality of vertical guards, said upper portion of said vertical guard being rigidly attached to a structural beam of a vehicle frame, and said vertical guards undergoing plastic deformation in response to rear impacts for absorption of the forced applied without damage to the vehicle, and each of said plurality of vertical guards are removably attached to a rear sill of a trailer, and a plurality of downwardly extending projections mounted on the rear sill, said projections engaging the upper end portion of said vertical guards for securement.

8. The rear impact guard assembly according to claim 7 wherein said plurality of holes includes a plurality of aligned elongated holes, said at least one tubular member extending into said plurality of elongated holes.

9. The rear impact guard assembly according to claim 8 wherein said horizontal member includes a plurality of downwardly extending projections, said projections engaging the upper ends of said vertical guards for securement.

10. The rear impact guard assembly according to claim 8 wherein said horizontal member includes opposed ends extending beyond said plurality of vertical guards.

11. The rear impact guard assembly according to claim 9 wherein said horizontal member is tubular.

12. A rear impact guard assembly for protection against rear impact forces for a vehicle a having frame structure and plurality of longitudinally extending slide rails comprising a plurality of vertical guards having upper and lower end portions, a horizontal member being affixed to said lower end portions, means for rigidly affixing said upper portions of said vertical guards to a lateral horizontal beam of the frame structure, bracket means for affixing the plurality of slide rails to the lateral horizontal member and to said vertical guards, and said vertical guards being subject to plastic deformation to absorb energy from the rear forces and prevent damage to the frame structure and the slide rails.

13. The rear impact guard assembly according to claim 12 further including second bracket means for attachment to the slide rails, said second bracket means mounting said vertical guards on the slide rails.

14. The rear impact guard assembly according to claim 12 wherein said means for affixing said upper portions of said vertical guards to the lateral horizontal member and said second bracket means removably mount said plurality of vertical guards.

15. The impact guard assembly according to claim 12 wherein said bracket means includes a pin for transmitting forces to the lateral horizontal member.

16. A rear impact guard assembly for a vehicle from protection against forces applied by rear impacts comprising a plurality of vertical guards being affixed to a rear of the vehicle and having upper and lower end portions, a horizontal member being affixed to the lower end portion of said plurality of vertical guards, said upper portion of said vertical guard being rigidly attached to a structural beam of a vehicle frame, and aid vertical guards undergoing plastic deformation in response to rear impacts for absorption of the forces applied as a result of said plastic deformation without damage to the vehicle, said plurality of vertical guards include a U-shaped configuration, and said U-shaped configuration includes a pair of spaced flanges, a shim connecting said spaced flanges for controlling plastic deformation of said vertical guards.

17. The impact guard assembly according to claim 15 wherein one of said spaced flanges includes a reinforcing flange.

* * * * *